No. 848,609. PATENTED MAR. 26, 1907.
J. J. WAGONER.
CORN HARVESTER.
APPLICATION FILED MAY 17, 1904.
3 SHEETS—SHEET 1.
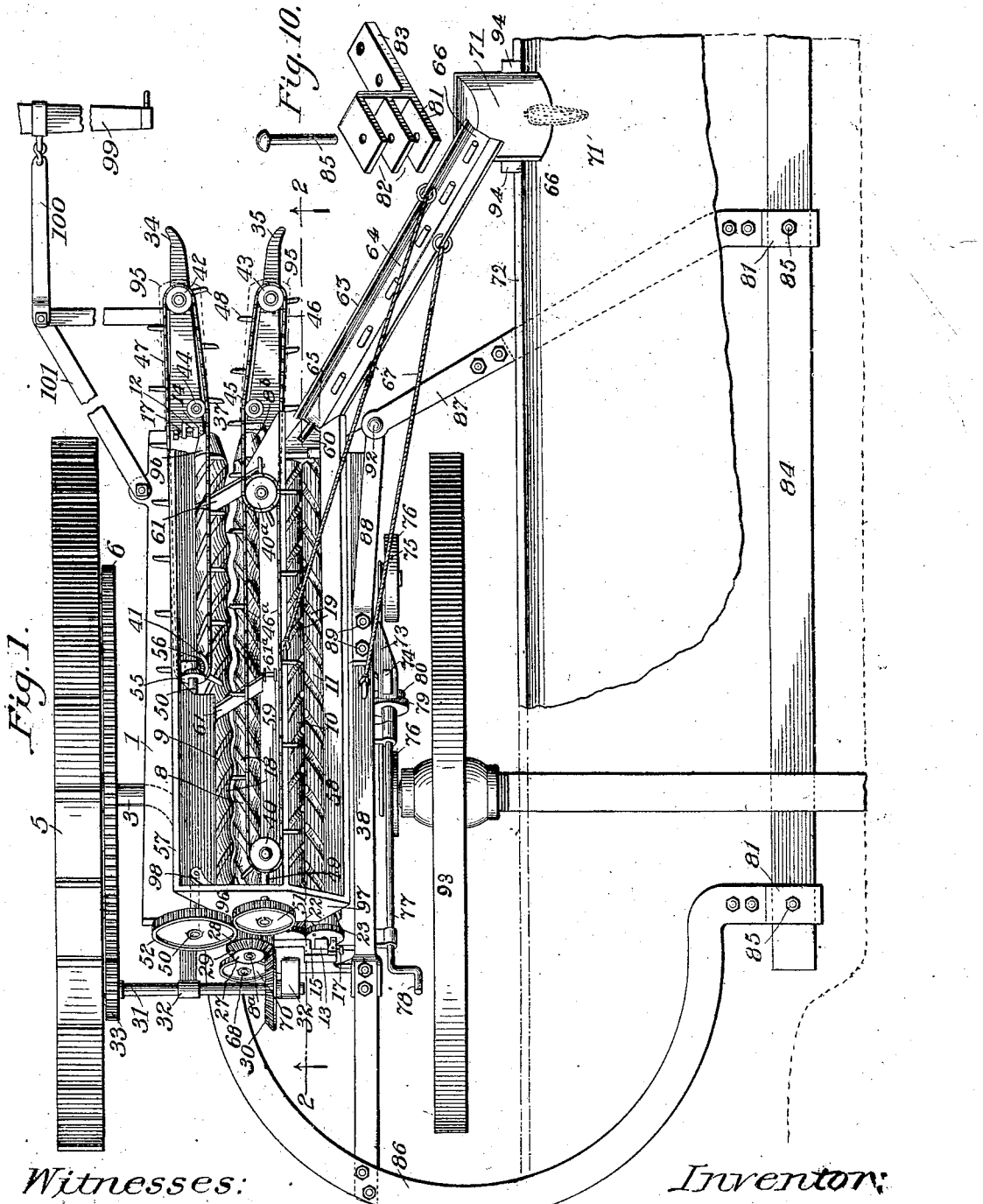
Witnesses:
Frank Cook
E. W. Koontz
Inventor:
John J. Wagoner No. 848,609. PATENTED MAR. 26, 1907.
J. J. WAGONER.
CORN HARVESTER.
APPLICATION FILED MAY 17, 1904.
3 SHEETS—SHEET 2.
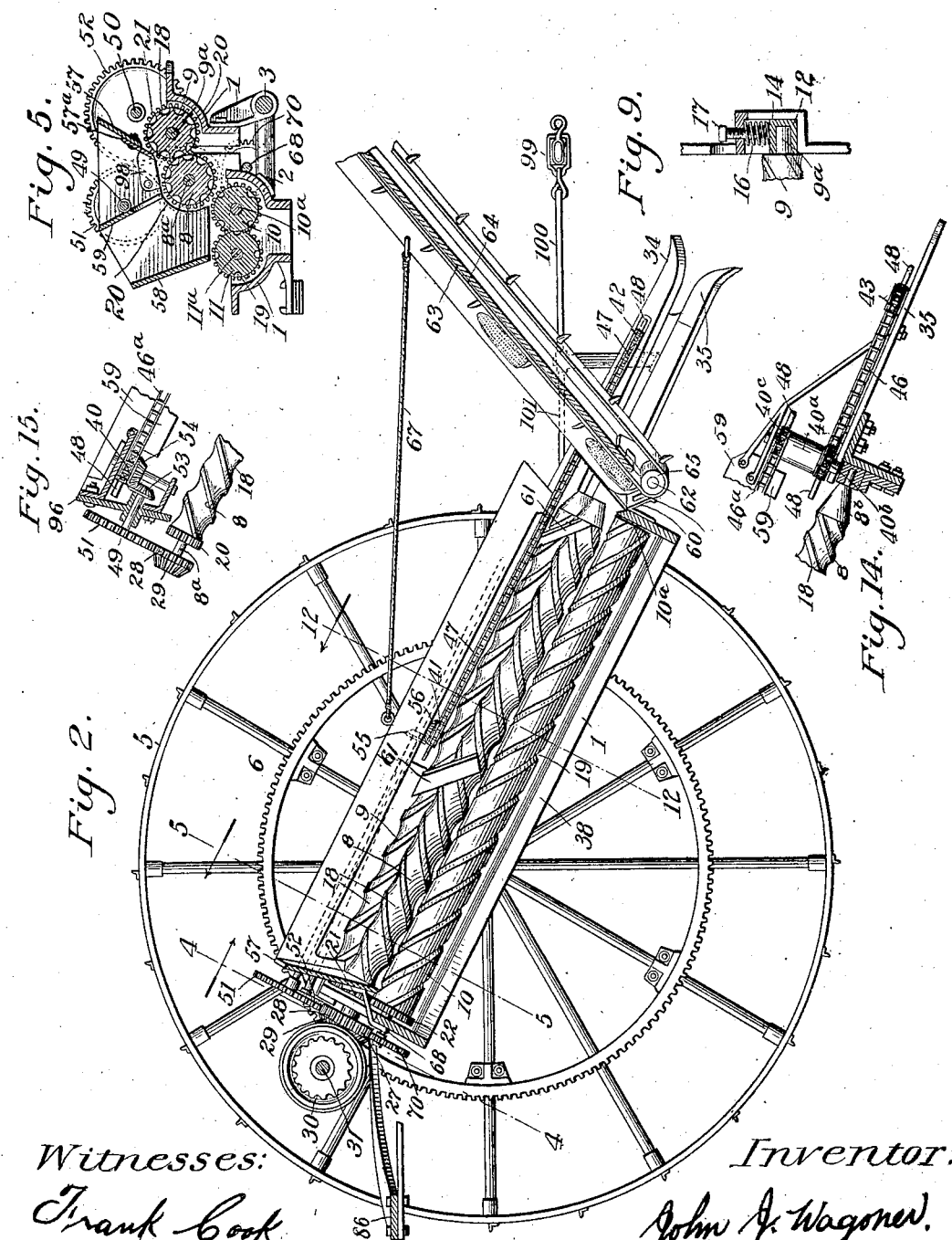
Witnesses: Inventor:
Frank Cook John J. Wagoner.

No. 848,609. PATENTED MAR. 26, 1907.
J. J. WAGONER.
CORN HARVESTER.
APPLICATION FILED MAY 17, 1904.
3 SHEETS—SHEET 3.
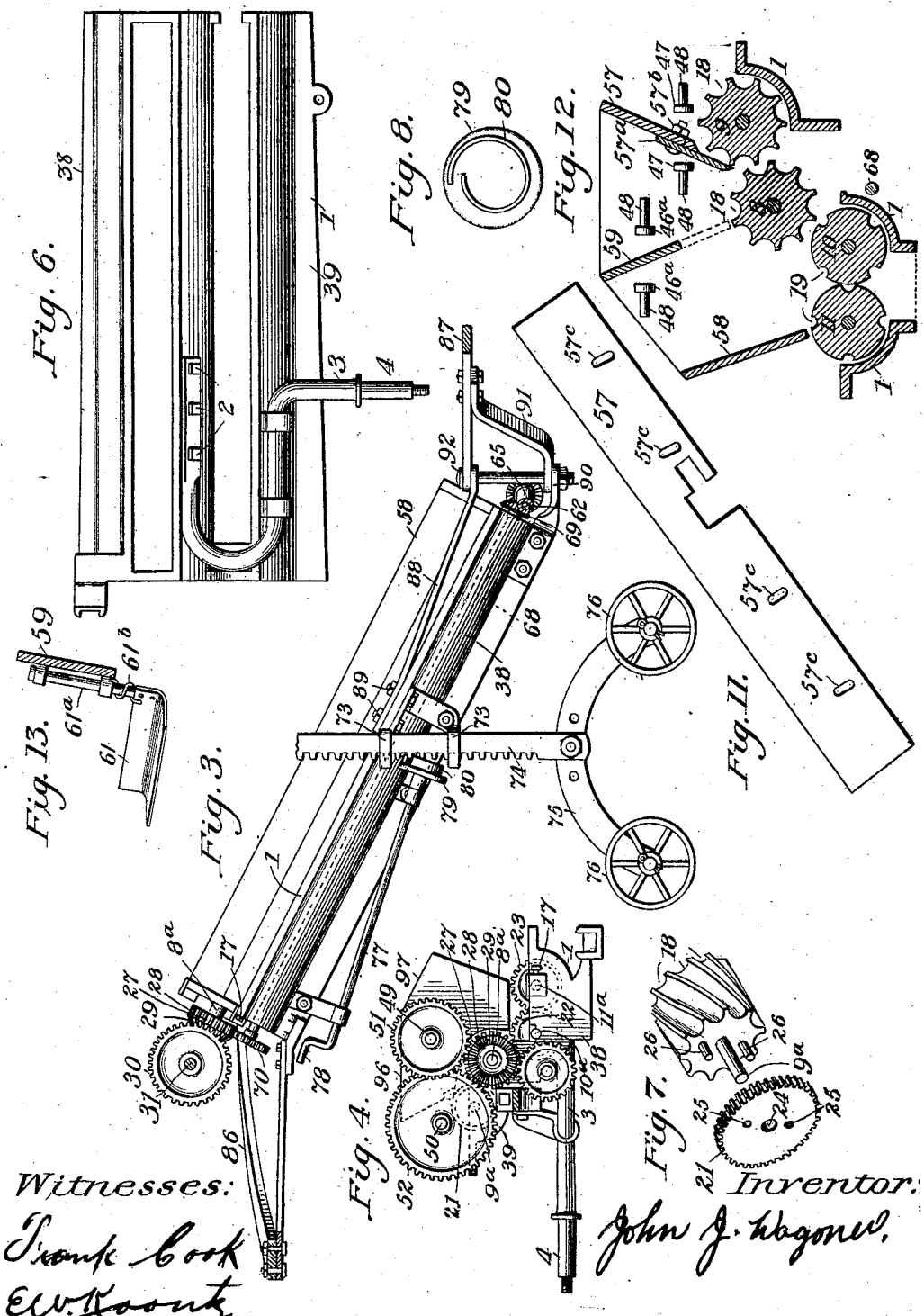
Witnesses:
Frank Cook
E. W. Koontz
Inventor:
John J. Wagoner

UNITED STATES PATENT OFFICE.

JOHN J. WAGONER, OF DELONG, INDIANA.

CORN-HARVESTER.

No. 848,609.    Specification of Letters Patent.    Patented March 26, 1907.

Application filed May 17, 1904. Serial No. 208,475.

*To all whom it may concern:*

Be it known that I, JOHN J. WAGONER, a citizen of the United States, residing at Delong, in the county of Fulton and State of Indiana, have invented a new and useful Corn-Harvester, of which the following is a specification.

This invention relates to corn-harvesters; and it has particular reference to a corn-harvesting machine which shall be adapted to be connected detachably with a wagon, so that it may be propelled over the ground along with such wagon and deliver into the wagon-box the ears of corn as they are removed from the stalks.

The invention has for its object to provide a device of this class which shall be simple in construction and effective in operation; and with this and other ends in view the invention consists in the improved construction, arrangement, and combination of parts, which will be hereinafter fully described, and particularly pointed out in the claims.

In the accompanying drawings has been illustrated a simple and preferred construction of the invention, it being understood, however, that I do not thereby limit myself to the precise structural details therein exhibited, but reserve the right to such changes, modifications, and alterations as may be resorted to within the scope of the invention and without departing from the spirit or sacrificing the utility of the same.

In the said drawings, Figure 1 is a top plan view of a corn-harvester constructed in accordance with the principles of my invention, showing the same attached in operative position to the running-gear of a wagon. Fig. 2 is a sectional elevation taken on the line 2 2 in Fig. 1. Fig. 3 is a detail side elevation of the casing and certain related parts. Fig. 4 is a sectional elevation taken on the line 4 4 in Fig. 2. Fig. 5 is a sectional view taken on the line 5 5 in Fig. 2. Fig. 6 is a detail bottom plan view of the casing. Fig. 7 is a perspective view showing the end of one of the snapping-rollers and the spur-wheel of the same detached therefrom. Fig. 8 is a face view of the disk having the spiral flange for operating the vertically-adjustable supporting device. Fig. 9 is a sectional detail view illustrating one of the movable roller-bearings. Fig. 10 is a perspective detail view of one of the clips or connecting devices for connecting the harvester with the running-gear of a wagon. Fig. 11 is a detail view of the outer deflecting guard-board. Fig. 12 is a sectional view taken about centrally on the line 12 12 in Fig. 2. Fig. 13 is a detail view showing one of the actuated doors or closures 6c and pivotally connected to the intermediate guard-board. Fig. 14 is a sectional detail view showing the inner gathering-arm and the double sprocket-wheels and its connecting devices for the gathering and elevating chains. Fig. 15 is a sectional detail view showing the gearing for operating the elevating and gathering chains.

Corresponding parts in the several figures are indicated by similar numerals of reference.

The frame on my improved corn-harvester is in the nature of a casing 1, to the under side of which is suitably secured, as by means of bolts 2, a supporting-yoke 3, the outer arm of which has a laterally-extending spindle 4, upon which the ground-engaging drive-wheel 5 is journaled. Suitably connected with the wheel 5 and rotatable therewith is a gear-wheel 6, which serves to transmit motion to the operative parts of the device.

The frame or casing 1 is provided with bearings for a pair of snapping-rollers (designated 8 and 9) and for a pair of shucking-rollers or husking-rollers 10 and 11, said rollers being mounted on shafts which are designated, respectively, $8^a$ $9^a$ and $10^a$ $11^a$. The husking-rollers 10 and 11, the latter of which is the inner one, are disposed with their axes in the same inclined plane. The inner snapping-roller 8 is disposed above and partly overlapping the outer husking-rollers, and the outer snapping-roller 9 is disposed in a plane somewhat above and slightly overlapping the inner snapping-roller. The parts referred to as "inner" and "outer" are so described with reference to their position with relation to the ground-engaging wheel, which is at the outer side of the frame of the machine.

The shafts of the snapping-roller 8 and of the husking-roller 10 are mounted permanently in suitable bearings provided for the reception of the ends of said shafts in the frame or casing. The shafts of the snapping-roller 9 and of the husking-roller 11 are journaled in boxes designated, respectively, 12 and 13, said boxes being mounted to slide laterally in grooves or recesses 14 and 15 formed in the frame or casing for the accommodation of said boxes. The boxes 12 and 13 are forced in the direction of the bearings of the shafts $8^a$ and $10^a$ by the action of suitably-disposed springs 16, the pressure of which may be regulated by means of set-screws 17. This will regulate the extent to which the flexibly-mounted rollers 9 and 11 shall be permitted to move apart from the rollers 8 and 10, which latter have stationary bearings, as described, and it will be noticed that the front and rear ends of the flexibly-mounted rollers are movable independently of each other.

The extent to which the rollers 9 and 11 may be forced in the direction of the rollers 8 and 10 will be limited by the depth of the grooves or guideways 14 and 15. In practice the husking-rollers 10 and 11 when not spaced apart by material passing between them may lie in contact with each other. The snapping-rollers, on the other hand, will normally be slightly spaced apart, except at their extreme rear ends, even when no material is passing between them. Said snapping-rollers are made with conical or tapering points $8^b$ and $9^b$, and the bodies of said rollers are made slightly tapering throughout, as shown in Fig. 1, so that while the extreme rear ends of said rollers may contact with each other the bodies of said rollers in front of the tapering points shall be slightly spaced apart, even when no material is passing between the rollers. This is a feature of the invention which I consider to be specially important, for the reason that by this precise construction the snapping-rollers will engage the cornstalks that are to be operated upon with more certainty and precision than would be possible if the bodies of the rollers were permitted to normally contact with each other throughout their lengths.

The snapping-rollers, as well as the husking-rollers, are spirally grooved or rifled throughout their lengths, as indicated in the drawings at 18 and 19, respectively, excepting the grooves or rifles on the snapping-rollers are larger and closer together. When the rollers are properly located in their respective bearings, the grooves or rifles of one roller will face between the other grooves or rifles of the opposite roller, whereby as the rollers revolve the ridges in one roller will be interposed between the ridges of the other, as shown in Figs. 5 and 12. This enables the respective rollers to take a better hold of the material that is to be operated upon and renders the operation more sure and effective.

The snapping-rollers 8 and 9 are provided with gear-wheels 20 and 21 at their rear ends, said gear-wheels meshing with each other, so that the said rollers will be rotated in opposite directions. The husking-rollers 10 and 11 are likewise provided at their ends with intermeshing gear-wheels 22 and 23, whereby they will be oppositely rotated. The gear-wheel 22 of the husking-roller 10 meshes with the gear-wheel 20 of the roller 8, said roller 8 being the one from which motion is imparted to the remaining rollers. The preferred method of connecting the gear-wheels with the respective rollers has been illustrated in Fig. 7 of the drawings, by reference to which it will be seen that each of said gear-wheels is provided with a central shaft-engaging opening 24 and with additional eccentrically-disposed openings 25, through which latter pins 26 extend into the ends of the respective rollers, with which the gear-wheels are thus very securely connected, but in such a manner that the parts may be readily disassembled when desired for the purpose of making necessary repairs.

The shaft $8^a$ of the roller 8 is extended rearwardly, and it carries a gear-wheel 27, having circumferentially-disposed straight teeth 28 and beveled teeth 29. The beveled portion of the gear-wheel 27 meshes with a bevel-gear 30, mounted upon a shaft 31, for which bearings 32 are provided in the rear part of the frame or casing of the machine. The shaft 31 carries a pinion 33, meshing with the gear-wheel 6, which is connected with the ground-engaging wheel 5 and which constitutes the power-wheel of the device.

The frame or casing is provided at its front end with diverging guiding or gathering arms 34 35, the rear ends of which converge in the direction of the triangular space between the tapering or conical front ends of the snapping-rollers, the frame or casing being provided at its point with a gap 37 for the admission of the cornstalks. It will be observed that said frame or casing is necessarily composed of two projecting parts or members—namely, the inner member 38 and the outer member 39—said inner and outer members being strengthened at the rear by means of the yoke 3, having the spindle 4. The outer member 39 of the casing carries the outer snapping-roller 9, while the inner snapping-roller 8 and both husking-rollers are mounted in the inner member of the casing.

The frame or casing is provided with suitable bearings for the shafts of a pair of sprocket-wheels 40 and 41, disposed, respectively, above the snapping-rollers 8 and 9, the sprocket-wheel 40 being located at the rear end of the inner snapping-roller 8, while the sprocket-wheel 41 is disposed about centrally above the outer snapping-roller 9.

The sprocket-roller $40^a$ is mounted upon a shaft and is disposed at the front end of the inner snapping-roller 8 and having bearings upon the rear end of the inner gathering-arm 35. This sprocket-roller $40^a$ is provided with two sprocket-wheels. The lower sprocket-wheel $40^b$ supports the endless gathering-chain 46, that makes connection with sprocket-wheel 43. The upper sprocket-wheel $40^c$ supports the endless elevator or guide-chain $46^a$, that makes connection with sprocket-wheel 40. Additional sprocket-wheels 42 and 43 are mounted upon shafts having bearings upon the guiding-arms 34 and 35, and guide-rollers 44 and 45 are likewise mounted upon said arms near the rear ends of the latter. The sprocket-wheels 40ª 43 and 41 42 in connection with the guide-rollers 45 44 support the endless gathering-chains 46 47, which are provided with teeth 48, serving to engage the cornstalks and to carry them between the snapping-rollers, the elevated chain 46ª being extended rearwardly, as shown, and disposed to somewhat overhang the snapping-roller 8. The peculiar arrangement of having the outer snapping-roller 9 slightly overlapping the inner snapping-roller 8 is for the purpose of giving the latter a smaller surface for the ears of corn to pass over the roller more easily. This arrangement will permit the cornstalks to lean inwardly and overhang the snapping-roller 8, so that the cornstalks will rest heavily upon the elevator-chain 46ª. The action of said chain will make the latter a positive feed.

For the purpose of transmitting motion to the endless chains 46, 46ª, and 47 I provide a pair of shafts 49 50, suitable bearings for which are provided in the frame of the machine and the former of which is located above and suitably spaced from the snapping-roller 8, while the latter is located above and at no great distance from the roller 9. The rear ends of the shafts 49 and 50 carry gear-wheels 51 52, both of which mesh with the gear 28 upon the shaft of the roller 8. The shaft 49 is extended in rear of the sprocket-wheel 40 and is provided with a bevel-pinion 53, meshing with a bevel-pinion 54 upon the shaft of the sprocket-wheel 40 in front of the axis of said shaft. The shaft 50 carries at its front end a bevel-pinion 55, meshing with the bevel-pinion 56 upon the shaft of the sprocket-wheel 41 in rear of the axis of the latter. It will be seen that in this manner motion is transmitted to the gathering-chains 46, 46ª, and 47 in such direction that the adjacent leads of said chains shall move rearwardly when the machine is in operation, thus effectively engaging the cornstalks which come into the path of said chains.

The frame or casing supports a deflecting-board 57, the lower edge of which is disposed closely contiguous to the outer snapping-roller 9, the office of which is to prevent ears of corn that are being snapped off the stalks by the snapping-rollers from escaping outwardly over the outer snapping-roller. The regulating or protecting guard-board 57ª is partly overlapping the lower side of the deflecting-board 57 and is projecting downwardly closely contiguous to the inner side of the outer snapping-roller 9, which may be regulated by means of bolts 57ᵇ through slots 57ᶜ, as shown in Figs. 5 and 12. The presence of this regulating or protecting board is found desirable and even necessary in spite of the peculiar arrangement of the rollers 8 and 9 with relation to each other. The particular employment of this protecting guard-board 57ª will deflect and prevent the snapping-rollers from nibbling or taking hold of the ears of corn; otherwise the latter would be more or less shelled or crushed and will tend to force the ears of corn that are being removed from the stalks in an inward direction over the snapping-roller 8 and onto the subjacent husking-rollers 10 and 11. A deflecting-board 58 is supported adjacent to the inner husking-roller 11, and an intermediate guide-board 59 is spaced above the snapping-roller 8, and deflecting-board 57 is supported adjacent to the snapping-roller 9, said board 59 being, however, spaced sufficiently above said roller to permit the ears of corn to pass over the snapping-roller 8 under the lower edge of said intermediate board and onto the husking-rollers 10 and 11. The front ends of the deflecting-boards 58 and 59 are made to converge, so as to form a chute to the spout 60, serving to direct the husked corn to the elevator, which will be presently described.

Hingedly connected with the intermediate deflecting-board 59 by a swivel-stem 61ª and coil-actuating spring 61ᵇ is a spring-actuated rearwardly-opening door or closure 61, which will readily yield to the pressure of stalks of corn entering between the snapping-rollers, but which as soon as the stalks have entered between said rollers will be forced in a forward direction. The function of this door or closure is to prevent ears of corn from sliding down upon the snapping-rollers and from being lost or dropped over the front ends of the latter. Also any suitable number of these spring-actuated closures can be disposed along the snapping-rollers 8 and 9. The ears of corn that are elevated above said spring-closures 61 will not only prevent the same from sliding downward upon the snapping-rollers, but will assist the regulating or protecting guard-board 57ª to force the ears of corn in an inward direction over the inner snapping-roller and onto the subjacent husking-rollers 10 and 11.

The front end of the frame or casing supports a shaft 62, on which is mounted a trough or casing 63, containing an endless carrier or elevator 64, consisting of an endless belt or band supported by a roller 65 upon the shaft 62 and upon an addtional roller 66 at the upper end of the trough or casing. This elevator is supported directly in front of the spout or discharge 60, over which the husked ears of corn are discharged. Guy ropes or rods 67 are used to support the elevator-casing in operative position.

The endless carrier of the elevator is driven from a shaft 68, journaled longitudinally in the casing and connected at its front end by suitable gearing 69 with the shaft 62, carrying the roller 65. The rear end of the shaft 68 has a pinion 70, meshing with the gear 28 upon the shaft of the roller 8. It will be observed that the casing of the elevator extends obliquely from the front end of the casing of the machine, so that it will be enabled to discharge into a spout 71, detachably connected with the box 72 of the wagon with which the machine is temporarily connected for operation.

Upon the inner side of the frame of the machine is provided a lifting device, which is secured by guides or keepers 73 of a vertically slidable rack-bar 74, the lower end of which is adjustably connected with a longitudinally-disposed arched beam 75, the front and rear ends of which are provided with supporting-wheels 76. The inner side of the frame of the machine is provided with bearings for a shaft 77, having at its rear end a crank or handle 78 and at its front end a disk 79, the face of which is provided with a spirally-disposed flange or worm 80, which engages the teeth of the rack-bar 74. It will be observed that by rotating the shaft 77 the rack-bar 74 by engagement with the spiral flange 80 will be raised or lowered, according to the direction of rotation. Hence the wheels 76 may be raised or lifted from the ground or lowered into contact with the ground by simply rotating the shaft 77 in the proper direction, said wheels being retained at the position to which they are adjusted by contact with the spiral flange 80 with the teeth of the rack-bar 74. When the machine is in active operation, these wheels are elevated from the ground to an inoperative position. When it is desired to detach the harvesting-machine from a wagon, the rack-bar carrying the wheels 76 is lowered until said wheels rest upon the ground, and the machine will thus be supported while the loaded wagon is disconnected therefrom and the empty wagon is connected with the harvester.

The means for connecting the harvester with the running-gear of a wagon includes a pair of blocks 81, each of which is provided with a plurality of recesses 82 and with a laterally-extending flange 83. The reach 84 of the running-gear may be engaged by any one of the recesses 82 and be connected with the block 81 by means of a pin or bolt 85. By providing a plurality of recesses 82, as herein described, the flange 83 may be adjusted at various elevations. If further adjustment be necessary, either block, or both, can be reversed the under side up to accommodate the tilt of the harvester and the height of the reach, as will be readily understood. Suitably connected with the rear part of the frame is a curved brace 86, which is extended so as to be capable of being connected with the flange 83 of the rear connecting-block. The front connecting-block is connected by a brace 87 with a brace 88, the front end of which is seated upon the inner side of the frame 1 and is securely connected with the latter by means of bolts 89. The lower part of the frame or casing has a forwardly-extending lug 90, and a curved brace-rod 91, bolted to the under side of the brace 87, terminates in alinement with and directly above the said lug 90. A connecting-bolt or king-bolt 92 extends vertically through the meeting ends of the braces 87 and 88 and through perforations in the brace-rod 91 and the lug 90, thus serving to complete the coupling of the harvesting-machine with the running-gear of the wagon. The hind wheel 93 of the latter runs between the wagon-box and the harvester-frame, as will be seen.

The spout 71, to which reference has been made above, is in practice to be connected detachably by clips or clamping devices 94 with the box of the wagon to which the harvesting-machine is attached in such a position as to receive the discharge from the elevator and conduct the same into the wagon-box. It is obvious that this spout may be very easily adjusted in proper operative position, and, if preferred, the spout 71 can be detached and the elevator can be moved in such a position as to deliver the discharge direct into the wagon-box.

The gathering-chains 46 and 47 may when preferred be partially covered by means of hoods 95, which may be of sheet metal or other suitable material, and the rear ends of the deflecting-boards 57 59 and 58 59 may be suitably connected by means of cross-pieces 96 and 97, and in front of the cross-piece 97 to the inner side of the deflecting-board 57$^a$ is secured a metallic guard 98, whereby cornstalks the tops of which have not passed entirely between the snapping-rollers will be deflected forwardly and caused to pass between said rollers without sticking and interfering with the progress of the machine.

Suitably connected with the outer part of the frame of the machine is a draft attachment comprising a swingletree 99, a link 100, and a suitably-braced bracket 101. In practice a draft-animal is hitched to the swingletree 99 to assist in the propulsion of the machine, which is otherwise effected by the team attached to the wagon with which the machine is connected for operation. By this auxiliary draft attachment the draft is equalized and the operation is rendered more smooth, easy, and efficient than would otherwise be the case.

From the foregoing description, taken in connection with the drawings hereto annexed, the operation and advantages of my improved corn-harvesting machine will be readily understood by those skilled in the art to which it appertains. It will be observed that the machine is capable of being very easily and swiftly attached to or disconnected from the running-gear of an ordinary wagon. Hence when a wagon-load of husked corn has been accumulated the loaded wagon may be disconnected and driven away and an empty one may be connected with the machine, the latter being meanwhile supported upon the ground-engaging wheel 5 and upon the supporting-wheels 76, which have been temporarily lowered, as described. By the connecting means herein described, including the blocks 81, having a plurality of reach-engaging recesses 82, the frame of my improved harvesting-machine is capable of being more or less tilted in a downward and forward direction. This is of extreme importance, for the reason that when the corn is in good condition—that is, when the stalks are tall and straight—a longer time will be required for the stalks to pass between the snapping-rollers, and consequently the latter should be placed more approximately in a horizontal position. When, on the other hand, the corn is low and down, the position of the snapping and husking rollers should more nearly approach the vertical. It is obvious that as the stalks enter between the snapping-rollers the rotation of the latter will operate to feed the said stalks downwardly. When the ears are encountered, the latter will be quickly snapped off and caused to drop upon the husking-rollers, which latter will seize upon the husks and quickly strip them off the ears, the husks escaping downwardly through the casing of the machine, which is to be provided with a suitable slot for the escape of the husks. The ears having been stripped of their husks will slide downwardly upon the husking-rollers and will pass over the spout or nozzle 60 onto the carrier of the elevator, whereby they are elevated and dumped into the spout 71, connected with the wagon-box, into which they are finally deposited.

The method of operation and the means of transmitting motion to the various operating parts of the device will be readily understood, and it will be noticed that in the construction of the machine all unnecessary complication has been avoided, the parts being comparatively few and simple. The harvesting-machine constructed as herein described occupies comparatively little room and may consequently be conveniently stored when it is not in use. This fact is of considerable importance when it is considered that many expensive harvesting-machines and other implements are ruined for no other reason than that on account of their excessive size shelter is not provided for them.

Having thus described my invention, I claim—

1. In a machine of the class described, a harvester-frame, provided with two forwardly-projecting members, a driving and supporting wheel for one side of said frame, and vertically-adjustable means for attaching the other side of said frame to a wagon, a bracket extending laterally from the drive-wheel side of the harvester-frame, and means for attaching a draft-animal to said bracket.

2. In a machine of the class described, a frame or casing, provided with two suitable forwardly-projecting members, a ground-engaging wheel supporting one side of said casing, a draft device attached to the outer side of the outer member; a slidable rack-bar, the inner side of the inner member having a suitable guideway for the passage of said rack-bar, and means for operating the latter.

3. In a harvesting-machine, the combination with a wagon running-gear, a harvester-frame, rotary supporting means for the outer side of said frame, and means for connecting the inner side of the harvester-frame with said running-gear, a rack-bar, the inner side of said frame provided with a guideway for the passage for said rack-bar, the lower end of said rack-bar being provided with supporting means, and operating means including a crank-shaft for lowering and raising said rack-bar.

4. In a machine of the class described, a frame or casing, provided with two forwardly-projecting members, a ground-engaging wheel supporting the outer side of said casing, a bracket attached to the outer side of the outer member, and a draft attachment connected with said bracket, a slidable rack-bar, the inner side of the inner member having a suitable eye for the passage of the said rack-bar, and means for operating said rack-bar.

5. In a harvesting-machine, the combination with a running-gear, a harvester-frame, rotary supporting means for the outer side of said frame, braces connected with the rear and front ends of said frame and extending laterally from the inner side of the latter, and means adapted for adjustably connecting their free ends with the reach of said running-gear.

6. A harvester frame or casing, a ground-engaging wheel supporting one side of said casing, braces connected with and extending from the opposite side of said casing, a running-gear, and connecting means including blocks, each having a plurality of recesses to engage the reach of said running-gear, and each provided with an overhanging flange connected with the free end of one of the braces.

7. A harvester-casing, a ground-engaging supporting-wheel for the outer side of said casing, a running-gear, connecting means between said running-gear and the inner side of the harvester-casing, and auxiliary supporting means vertically adjustable with relation to the inner side of said harvester-casing.

8. A harvester-casing, a ground-engaging supporting-wheel for the outer side of said casing, braces connected with said casing and extending laterally from the inner side of the latter, a running-gear adjustably supporting the free ends of said braces, and auxiliary supporting means vertically adjustable with relation to the inner side of the harvester-casing.

9. A harvester-casing, a ground-engaging supporting-wheel for the outer side of said casing, a running-gear, connecting means between the latter and the inner side of the harvester-casing to support the latter, a bracket extending laterally from the outer side of the harvester-casing in front of the supporting-wheel, and a draft attachment connected with said bracket.

10. A harvester-casing, rotary supporting means for the outer side of said casing, a running-gear, and adjustable connecting means between the latter and the inner side of the harvester-casing, said connecting means including a pair of braces connected respectively with the inner side of the harvester-casing and with the reach of the running-gear, a bolt connecting said braces, a lug extending forwardly from the harvester-casing and having an opening for the passage of the connecting-bolt, and a curved brace-bar connecting said bolt with the brace extending to the reach of the running-gear.

11. In a harvesting-machine, the combination with a wagon running-gear, a harvester-frame having two forwardly-projecting members, rotary supporting means for the outer side of said frame, connecting means between said running-gear and the inner side of the harvester-frame to support the latter, a wagon-box supported upon said running-gear, an elevating device connected with and extending obliquely forward and inward from the front end of the inner member and disposed to receive the discharge from said member.

12. In a corn-harvester, a casing having a longitudinal inclination, a ground-engaging supporting-wheel on one side of said casing and braces firmly connected with each end of said casing, a running-gear, connecting means between said running-gear and the ends of the harvester-casing, and auxiliary supporting means vertically adjustable with relation to the ends of the harvester-casing.

13. In a harvesting-machine, the combination with a running-gear, a harvester-frame, rotary supporting means for the outer side of said frame, braces connected with and extending laterally from the inner side of said frame and adapted to be connected at their free ends with said running-gear, an elevating device connected with and extending obliquely forward and inward from the front end of said frame, a wagon-box supported by said running-gear and disposed to receive the discharge from said elevating device.

14. In a corn-harvester, a pair of snapping-rollers, a pair of husking-rollers disposed below and overlapped by the inner snapping-roller, and shafts supporting said rollers, slidable bearings for the outer snapping-roller and for the inner husking-roller, springs disposed to press said bearings in the direction of the shafts of the other rollers, and means for limiting the movement of said slidable bearings, set-screws adapted to regulate the pressure of said springs.

15. In a corn-harvester, a casing, a pair of snapping-rollers mounted in said casing, a pair of husking-rollers disposed below the plane of and overlapped by the inner snapping-roller, said snapping-rollers having spiral grooves or riffles the grooves in each roller arranged opposite the ridges of the other.

16. In a corn-harvester, a pair of snapping-rollers having slightly-tapering bodies, the outer snapping-roller slightly disposed above the plane of the inner snapping-roller, a pair of husking-rollers disposed below the plane of and overlapped by the inner snapping-roller over the outer husking-roller, and shafts supporting said rollers, the axes of which are mounted in suitable bearings.

17. In a corn-harvester, a casing having two forwardly-projecting members, a slightly-tapering snapping-roller supported by the outer member, a similar snapping-roller supported by the inner member, a guard-board disposed closely to the outer snapping-roller, a guard-board suitably spaced above the inner snapping-roller, spring-closures suitably spaced along the snapping-rollers and pivotally attached to the inner guard-board.

18. In a corn-harvester, a casing, a pair of snapping-rollers mounted in said casing, a pair of husking-rollers disposed below the plane of and overlapped by the inner snapping-roller, a deflecting guard-board disposed closely to the outer snapping-roller, an adjustable protecting guard-board projecting downwardly closely to the inner side of the outer snapping-roller, and means for attaching said adjustable board to said deflecting-board, a deflecting guard-board disposed closely to the inner husking-roller, an intermediate guard-board spaced above the inner snapping-roller, spring-closures pivotally attached to said intermediate board, connecting means between the rear ends of said guard-boards.

19. In a corn-harvester, a casing, a pair of snapping-rollers mounted in said casing, the outer snapping-roller being disposed above the plane of the inner snapping-roller, a pair of husking-rollers disposed below the plane of and overlapped by the inner snapping-roller, guard-boards adjacent to the outer snapping-roller and to the inner husking-roller, an intermediate guard-board spaced above the inner snapping-roller, and a spring-actuated closure between said intermediate and outer guard-boards, said closure being located near the points of the snapping-rollers.

20. In a corn-harvester, a pair of snapping-rollers, a guard-board adjacent to the outer snapping-roller, a protecting guard-board projecting downwardly to the inner side of the outer snapping-roller and attached near the lower side of said guard-board, means for vertical adjustment of the protecting guard-board.

21. In a corn-harvester, a pair of slightly-tapering snapping-rollers, a deflecting guard-board disposed closely to the outer snapping-roller, a protecting guard-board attached to said deflecting board and projecting downwardly to the inner side of the outer snapping-roller, a guard-board spaced above the inner snapping-roller, spring-closures disposed along the snapping-rollers between said guard-boards and pivotally attached to one of said guard-boards.

22. In a corn-harvester, a casing, a pair of snapping-rollers mounted in said casing, an outer deflecting guard-board, a protecting guard-board attached to said deflecting-board and extending downwardly and parallel to the inner side of the outer snapping-roller, a deflecting guard-board spaced above and parallel with the inner snapping-roller, flexible closures between said deflecting-boards, one of said closures being located near the points of said rollers.

23. In a corn-harvester, a pair of snapping-rollers, guard-boards adjacent to said snapping-rollers, connecting means between the rear ends of said guard-boards, and a stalk-guard connected with one of said guard-boards in front of the rear connecting means.

24. In a corn-harvester, a pair of snapping-rollers, a guard-board adjacent to the outer snapping-roller, and a protecting guard-board extending downwardly contiguous to the inner side of the outer snapping-roller and attached near the lower side of said guard-board, means for adjustment of said protecting guard-board, a pair of husking-rollers disposed below the plane of and overlapped by the inner snapping-roller, a guard-board disposed closely to the inner husking-roller, an intermediate guard-board spaced above the inner snapping-roller, spring-closures suitably disposed along the snapping-rollers and pivotally attached to said intermediate guard-board.

25. In a corn-harvester, a pair of snapping-rollers, a pair of husking-rollers disposed below and overlapped by the inner snapping-roller, guard-boards one adjacent to the outer snapping-roller and one adjacent to the inner husking-roller, a protecting guard-board attached to the outer guard-board and extending downwardly and parallel to the inner side of the outer snapping-roller, and means for adjustment of the protecting guard-board, an intermediate guard-board spaced above the inner snapping-roller, spring-closures disposed along the snapping-rollers between the intermediate and the outer guard-board and pivotally attached to said intermediate guard-board.

26. In a corn-harvester, a frame, a pair of snapping-rollers supported by said frame, the outer snapping-roller being disposed above the inner snapping-roller, guard-boards suitably spaced above the snapping-rollers, spring-closures suitably spaced along the snapping-rollers between said guard-boards and hingedly attached to the inner guard-board.

27. In a corn-harvester, a casing inclining rearwardly and upwardly and mounted upon an arch-axle, a ground-engaging supporting-wheel mounted upon the outer end of said axle, a pair of snapping-rollers having slightly-tapering bodies, the outer snapping-roller disposed above the inner snapping-roller, a pair of husking-rollers disposed below and overlapped by the adjacent snapping-roller, and vertically-adjustable supporting means for the ends of said casing.

28. In a corn-harvester, a pair of snapping-rollers, a deflecting guard-board disposed closely to the outer snapping-roller, an adjustable protecting guard-board partly disposed below and overlapping the deflecting guard-board and projecting downwardly adjacent to the inner side of the outer snapping-roller, and means for vertical adjustment of said protecting guard-board.

29. In a corn-harvester, a casing having two forwardly-projecting members, the outer member supporting a snapping-roller, the inner member supporting a similar snapping-roller; and a pair of husking-rollers, said husking-rollers disposed below the plane of and overlapped by the inner snapping-roller, a discharge-spout attached to said inner member at the front ends of said husking-rollers.

30. In a corn-harvester, a casing having two forwardly-projecting members, a slightly-tapering snapping-roller mounted in the outer member, a similar snapping-roller mounted in the inner member, said rollers normally spaced slightly apart except at their extreme rear ends, a pair of husking-rollers disposed below and overlapped by the inner snapping-roller, permanent bearings for the inner snapping-roller and the outer husking-roller, slidable spring-pressed bearings for the outer snapping-roller and for the inner husking-roller, and means for limiting the movement of said slidable spring-pressed bearings.

31. In a corn-harvester, a pair of snapping-rollers, a pair of husking-rollers disposed below the plane of and overlapped by the adjacent snapping-roller, a discharge-spout at the front ends of the husking-rollers, an elevating device disposed to receive the discharge from said spout, and means for operating the snapping and husking rollers and the elevating device.

32. In a machine of the class described, a harvester frame, rotary supporting means for the outer side of said frame, a wagon running-gear and means for connecting the inner side of said frame with the wagon running-gear, a wagon-box mounted upon said running-gear, an elevating device connected with and extending obliquely forward and inward from the front end of the harvester-frame, said wagon-box disposed to receive the discharge from said elevating device.

33. In a corn-harvester, a pair of snapping-rollers having slightly-tapering bodies, guard-boards suitably spaced above the snapping-rollers, spring-actuated closures suitably disposed along said snapping-rollers and hingedly connected to the inner guard-board.

34. In a device of the class described, a harvester-casing, rotary supporting means for the outer side of said casing, a running-gear, means for connecting the inner side of said harvester-casing with and supporting the same upon said running-gear, a wagon-box supported upon the latter, an elevating device connected with and extending obliquely from the harvester-casing, and a spout connected adjustably with the wagon-box and adapted to receive the discharge from said elevating device.

35. In a corn-harvesting machine, a pair of slightly-tapering snapping-rollers, a guard-board spaced above parallel with the inner snapping-roller, spring-closures suitably spaced along the snapping-rollers and pivotally attached to said guard-board.

36. In a corn-harvesting machine, a pair of slightly-tapering snapping-rollers, a deflecting guard-board adjacent to the outer snapping-roller, a protecting guard-board disposed near the lower side of and overlapping the deflecting guard-board and projecting downwardly closely to the inner side of the outer snapping-roller, and means for attaching the protecting guard-board to said deflecting guard-board.

37. In a corn-harvester, a casing, a pair of snapping-rollers mounted in said casing, a pair of husking-rollers disposed below the plane of and overlapped by the inner snapping-roller, a deflecting guard-board disposed closely to the outer snapping-roller, an adjustable protecting guard-board attached to said deflecting guard-board and projecting downwardly and parallel to the inner side of the outer snapping-roller, a deflecting guard-board disposed closely to the inner husking-roller, an intermediate guard-board spaced above the inner snapping-roller, spring-closures pivotally attached to said intermediate guard-board, connecting means between the rear ends of said guard-boards.

38. In a corn-harvester, an arched axle, a casing provided with two forwardly-projecting members, the outer member being disposed above the inner member, said casing inclining rearwardly and upwardly and mounted upon the arch-axle, a ground-engaging supporting-wheel mounted upon the outer end of said axle, a pair of slightly-tapering snapping-rollers mounted in said casing, a guard-board spaced above the inner snapping-roller, flexible closures pivotally attached to said guard-board, a guard-board disposed closely to the outer snapping-roller, adjustable protecting guard-board projecting downwardly closely to the inner side of the outer snapping-roller and attached to the outer guard-board, means for vertical adjustment of the protecting guard-board.

39. In a harvesting-machine, the combination with a wagon running-gear, a harvester-frame, a driving and supporting wheel for the outer side of said frame, means for connecting the inner side of said harvester-frame with and supporting the same upon said running-gear, a wagon-box mounted upon the latter, an elevating device connected with and extending forwardly and inwardly from the front end of the harvester-frame, and means adapted for adjustably supporting the free end of said elevating device in relation to said wagon-box.

40. In a machine of the class described, a harvester-frame having two forwardly-projecting members, rotary supporting means for the outer side of said frame, a running-gear, connecting means between the latter and the inner side of the harvester-frame to support the latter, a wagon-box supported by said running-gear, an elevating device connected with and extending obliquely forwardly and inwardly from the front end of the inner member, said wagon-box disposed to receive the discharge from said elevating device.

41. In a harvesting-machine, the combination with a running-gear, a harvester-frame, an axle having a spindle at the outer end of said axle, the harvester-frame supported by said axle, a driving and supporting wheel mounted on said spindle, braces connected with each end of said frame and extending from the inner side of the latter, said running-gear adjustably supporting the free ends of said braces, and auxiliary supporting means vertically adjustable upon the side of the harvester-frame opposite the drive-wheel, an elevating device connected at the front end of said frame, a wagon-box supported by said running-gear, said elevating device arranged to receive the discharge from the harvester-frame and deliver the same into said box.

In testimony that I claim the foregoing as my own I have hereto affixed my signature in the presence of two witnesses.

JOHN J. WAGONER.

Witnesses:
   JOSEPH E. VANKIRK,
   SCHYLER RARRICK.